United States Patent
Mannl et al.

[11] Patent Number: 5,252,115
[45] Date of Patent: Oct. 12, 1993

[54] DEVICE AND FORMING FINGER FOR FORMING A MOUTH AREA ON A GLASS VIAL

[75] Inventors: Reinhard Mannl, Mitterteich; Alfons Wolfrum, Tirshenreuth; Franz Neumeier, Arzberg, all of Fed. Rep. of Germany

[73] Assignee: Schott Glaswerke, Mainz, Fed. Rep. of Germany

[21] Appl. No.: 756,845

[22] Filed: Sep. 10, 1991

[30] Foreign Application Priority Data

Sep. 11, 1990 [DE] Fed. Rep. of Germany ....... 4028823

[51] Int. Cl.$^5$ ............................................. C03B 23/09
[52] U.S. Cl. ......................................... 65/296; 65/109; 65/280; 65/282
[58] Field of Search ............ 65/297, 298, 296, 109, 65/280, 282; 425/393

[56] References Cited

U.S. PATENT DOCUMENTS

| | | | |
|---|---|---|---|
| 416,559 | 12/1889 | Brady | 65/298 |
| 1,006,383 | 10/1911 | Johns | 65/298 |
| 1,229,028 | 6/1917 | Bruner | 65/297 |
| 3,449,105 | 6/1969 | Dieman | 65/298 |
| 4,284,447 | 8/1981 | Dickens | 156/299 |
| 4,330,317 | 5/1982 | Vertova | 65/109 |
| 4,441,908 | 4/1984 | Zauner | 65/296 |

FOREIGN PATENT DOCUMENTS 581053 8/1959 Canada ................ 65/282

*Primary Examiner*—Joye L. Woodard
*Attorney, Agent, or Firm*—Millen, White, Zelano & Branigan

[57] ABSTRACT

A device and forming finger for forming a mouth area on a glass vial and a process for forming the glass vial wherein wear of the finger is reduced to a minimum so that better production tolerances for the formed mouth is possible. This is achieved by a forming finger being allocated either to each glass tube of a vial machine, or by providing play to the forming finger, or by providing the forming finger with lateral recesses. Preferably, the forming finger has a ratio of cross-sectional surface to circular segment area of the forming finger which is larger than or equal to 0.55×r. The aforedescribed forming fingers are used in all vial machines, in which from many glass tubes in a cycle, step by step vials are produced by rolling and melting the tube pieces.

15 Claims, 2 Drawing Sheets

DEVICE AND FORMING FINGER FOR FORMING A MOUTH AREA ON A GLASS VIAL

BACKGROUND OF THE INVENTION

The invention relates to a process for forming a vial, in which the mouth area is formed in an open, heat-softened end of a glass tube, as well as a device and a forming finger for forming a mouth area. Then vials, such as ampules, snap-cap glasses, beaded rim vials, etc. are produced from the formed glass tube end.

These vials or ampules are produced from glass tubes in vial machines, in which many glass tubes are held and rotated around their longitudinal axes and fed step by step to individual forming stations. At the forming stations the mouth area of each vial is also formed by rolling the glass tube end with one or more forming rollers.

Vial machines, forming stations and forming fingers of this type are known from DE-PS 15 96 410, 17 96 100 and 36 13 212. In these machines there is always allocated to a forming station one forming finger which is inserted in a glass tube provided by the vial machine. During rolling of the glass tube end the forming finger is held by forming rollers placed on the forming station for supporting the heat-softened glass from inside up to the end of the formation in the glass tube. The formation can take place at individual forming stations. The vial machine is then stopped at the individual forming stations and only after completed formation again moves on from a station.

In lieu of the aforedescribed stop-and-go operating principle, a continuous production is also possible, in which, e.g., four tool stations circulate on a forming station are, e.g, conveyed on a chain, and thus at a angle of rotation of the carousel move equidistantly with a glass tube that is moved past. At this angle, the toolholder is stationary relative to the longitudinal axis of the glass tube moving past it. The formation of the mouth area takes place simultaneously with the advancement of the tube by forming rollers carried along by each tool-holder and with a forming finger.

Since in the mouth formation the forming finger is in contact with the heat-softened glass over an extended period, the forming finger has to be produced from a high-grade heat- resistant material, and yet because of the operating conditions a frequent change of the forming finger is necessary, and each time the vial production has to be stopped. Also in using several formation stations, as described in DE-PS 15 96 410, the wear of the forming finger remains relatively large and in this case, in addition, the difficulty occurs that the toolholders, circulating with the forming finger, all have to be adjusted relative to the longitudinal axis of the respective glass tube provided by the carousel, so that a clean mouth formation is guaranteed. If the adjustment, e.g, because of wear on the chain drive of the toolholder or on a tool-holder itself is no longer precise, the entire forming station with, e.g., four tool-holders as an entire unit has to be overhauled.

SUMMARY OF THE INVENTION

An object of the invention is to conduct the forming process of a mouth formation so that the wear on the forming finger is as slight as possible. In this case especially, a slight maladjustment of the forming finger relative to the glass tube does not lead to greater wear or less mouth quality. Moreover, an object of this invention is also a corresponding device and a forming finger itself, which is to be as wear-resistant as possible.

Upon further study of the specification and appended claims, further objects and advantages of this invention will become apparent to those skilled in the art.

It has been shown that two factor contribute to increasing the resistance to wear of a forming finger, namely, on the one hand, the time, in which the forming finger is in contact with heat-softened glass in relation to the time in which the forming finger can cool, and, on the other hand, the shape of the forming finger or that of its holder.

Relative to the "operating conditions" of the forming finger it has been shown that it is particularly favorable if a forming finger is allocated to each glass tube in a vial machine, so that after a use of the forming finger for forming a mouth area the forming finger can cool for the remaining angle of rotation of the carousel until the beginning of the next forming cycle. Since a vial machine normally carries 12 to 24 glass tubes, the cooling time of the forming finger in the process according to the invention or the corresponding device is at least three times as long as in the prior art, and at the same time even the adjustment of the forming finger relative to axis of rotation of the glass tube to be formed is simplified and improved. Because the prolonged cooling time according to the invention also an inexpensive, less high-temperatureresistant material such as, e.g., bright drawn carbon steel (material number according to German steel quality key 1.2210) instead of the usual Tyrodur steel (material number 1.2842) is used.

Since the forming finger is allocated to only one glass tube and is torsion-resistant connected to the carousel, the in-and-out movement of the forming finger even in a continuous running of the vial machine take place in a twodimensional line of movement, whereas in the prior art a three-dimensional movement of the forming finger along the carousel periphery or a stopping of the vial machine is necessary. By the arrangement of the forming finger on the carousel of the vial machine it is, moreover, guaranteed that the forming finger is always in phase with the allocated glass tube, i.e., no coordination of the position relative to the respective glass tube has to take place. The forming finger therefore is always accurately positioned and can be adjusted with simple means.

The formation of a mouth area normally takes place over several positions of the carousel of a vial machine, and it is advantageous always to heat the glass tube end again in between with burners. The forming finger in the process according to the invention, or the related device, can be removed without great effort from the glass tube end for a short period and be reintroduced after heating, so that overheating of the forming finger is avoided. Such a short period introduction and removal of the forming finger in a continuous production according to the prior art in practice is not possible because of the associated considerable mechanical effort and thus the occurring adjustment problems.

According to one embodiment of the invention for forming a mouth area in an open, heat-softened end of a glass tube, a carousel is provided that carries many glass tubes, each able to rotate around their own longitudinal axis, which are thus advanced, in equal spacing distance from one another on a common circular path at a forming station. At the forming statement, a forming roller successively rolls the ends of the glass tubes and a forming finger supports the heat-softened end of the glass tube from the inside during the rolling process. According to the invention in the device a forming finger is allocated for each glass tube, and the forming fingers are placed on the carousel. Favorably, each forming finger is placed on two carriages, by which the forming finger can be shifted in a two-dimensional line of movement basically in the radial and longitudinal directions with request to the longitudinal axis of the allocated glass tube. This makes possible an especially simple guiding of the forming finger. With such simple guiding, the end position of the forming finger can easily be adjusted by setting of the end positions of the individual carriages, and one end position of one carriage (horizontal carriage) brings the forming finger on the longitudinal axis of the allocated glass tube, while the other carriage (vertical carriage) introduces the forming finger into the glass tube end. The forming finger is at the right level relative to the forming roller, if the vertical carriage is in its end position. The horizontal carriage is necessary so that the forming finger can be conveyed out of the area of the glass tube, so that the latter for another processing in the vial machine can be delivered downward.

In principle, the forming finger can also be shifted on a single carriage along a two-dimensional curve, but this is less advantageous since the adjustment of the forming finger then has to take place with the entire curve and not only, as described above, by setting of the end positions of the individual carriages.

Any equipment which makes a translation movement possible can be used for carriages in this invention. Such equipment may include, e.g., a piston-cylinder combination, a rail-guided truck or also a rail-guided sliding element.

Individually, or together with the above-described process, or the related device, a special configuration of the forming finger or the holder of the forming finger can also reduce wear and the resulting inaccuracies in the mouth formation.

Such a forming finger, which, for inside forming of the mouth area is guided into an open, heat-softened end of a glass tube, which is rolled by a forming roller, is distinguished in that it exhibits a cross-sectional surface. This deviates from the usual circular cross section, which exhibits only one or more circular segment areas which come in contact with the inside periphery of the mouth area and determine the inside radius of the mouth. But the cross-sectional surface of the forming finger as a whole is kept large enough so that the ratio of the cross-sectional surface to the length of the circular segment area or areas is larger than or equal to $0.55 \, r^1$, where r is the radius of the circular segment area. This means that the forming finger, which comes in contact with the heat-softened glass tube end only with its circular segment area(s), has a comparatively greater cross section surface for the dissipation of the amount of heat transmitted to the forming finger during this contact, than a circle with the same radius or a corresponding cake-shaped circular segment. By this measure, the forming finger according to the invention by its circular segment area can dissipate on its holder the amount of heat transmitted by the heat-softened glass tube end faster than a corresponding cylindrical forming finger. As a result with the forming finger according to the invention under otherwise same operating conditions a smaller heating of the finger occurs. It is advantageous if the cross-sectional surface of the forming finger is not reduced below the half surface of the complete circle laid over the circular segment area(s), i.e., if the cross-sectional surface is larger than or equal to $0.5 \, r^2 \cdot pi$, so that in any event sufficient mass for heat dissipation is available. Also the circular segment area is not to be too small, so that a sufficient smoothing of the inside periphery of the mouth area is guaranteed. A circular segment area of 60° to 190° is advantageous, and preferably a circular segment in a range of 100° to 150° is selected. If the forming finger has two opposite circular segment areas, these preferably are in the range of 100° to 150° each.

To support the lower glass edge of the heat-softened glass tube end, the forming finger on its lower end preferably has a support, which has a circular peripheral surface, and is arranged concentrically to the forming finger. The radius of this support is greater than the radius of the circular segment area. A stepped shaped forming roller with such a forming finger is then placed so that the smaller forming roller radius is located on the peripheral surface of the support. Thus the profile part with greater radius is oriented toward the circular segment area and a hollow space, basically rectangular in cross section is provided in which the heat-softened glass tube end is formed into a beaded rim or flanged rim of the vial mouth. The radius of the circular segment in this case again determines the inside radius of the mouth, the larger radius of the forming roller of the outside radius of the vial neck and the smaller radius of the forming roller determine the outside radius of the beaded rim.

Usually the radius of the circular segment depends on the desired inside radius of the mouth. Forming fingers with a radius between 2 mm and 20 mm can be used for special applications.

In a particular embodiment, the support, on which the glass tube end sits, can have a surface sloping toward the center. In this way a conical reflector surface is formed on the upper vial edge. The sloping surface can be designed at an angle of, e.g., 5° or 7°.

The peripheral surface of the support can also exhibit a recess on the area, on which the forming roller is located, so that the radius of the support in this area is somewhat reduced. This makes possible a reduction of the outside diameter of the vial edge, since the grinding wheel in this case can press closer to the forming finger.

With the forming finger according to the invention, undercuts can also be produced in the mouth area to be formed of the vial. For this purpose, the upper part of the circular segment area then has a widened projecting edge, which can be designed as a step or slant and correspondingly represents a second circular segment area with greater radius than the first circular segment area. The two circular segment areas are arranged concentrically. With such a forming finger, the back area is milled clear opposite a solid cylinder, so that the forming finger, after completed formation, can first be shoved back a little in the radial direction from the contact site of circular segment area inside the periphery of the mouth, and then be withdrawn without touching the mouth. Such a forming finger is preferably used in combination with only one forming roller, since generally in the usual use so far of two forming rollers two corresponding designed forming finger halves shiftable in opposite directions to one another would have to be used wherein they can be shifted together opposite one another. Such an arrangement exhibits only a very small cross-sectional surface relative to a corresponding complete circle and as a result, a satisfactory dissipation of the heat is no longer reliably guaranteed in each case.

The above-described embodiments of the forming finger according to the invention can advantageously be used especially in the use of only one forming roller. If two forming rollers, offset by 180° on the glass tube, are to roll the latter, the forming finger according to the invention has a symmetry (symmetry of the cross section), and two opposite circular segment areas are allocated to the forming rollers. But especially in the production of a mouth with an undercut area, the use of only one forming roller and one forming finger with symmetry is especially favorable, since no complicated means for swiveling opposite one another or shifting of two forming fingers in the mouth are necessary.

For cooling, the forming finger can be sprayed with oil during operation, which in practice can drain over the entire forming finger and suitably be collected in an oil drip tray located directly under the forming finger and be drained from it. Instead of oil draining over the entire forming finger especially by using slanted surfaces sloping toward the center of the forming finger it can also be favorable in the central area of the support to provide an oil drain hole, which then is connected by a preferably basically horizontal bore to the oil drip tray. Such an oil drip tray and optionally corresponding bores in principle can be used successfully in all forming fingers.

In accordance with another possibility for improvement of the forming process and reduction of the wear, the forming finger can be designed with a little horizontal play or inserted with such a play into a heat-softened glass tube end. The horizontal play allows a largely free movement of the forming finger radially to the longitudinal axis of the glass tube. This is achieved, e.g., by the forming finger being set on a ball-and-socket joint. This arrangement can optionally be combined with the above-described measures. The forming finger, which can be introduced into the open, heat-softened and of the glass tube for formation of the mouth area and after formation, can again be removed from it and during formation serves to support the heat-softened end of the glass tube from inside against the forming roller rolling the glass tube end from the outside. The forming finger is preferably connected by a holding plug to a ball-and-socket joint, which for limitation of its swiveling radius, is guided in a bearing and thus determines the swiveling radius of the forming finger. This movement freedom of the forming finger in a range of ±1.0 mm, preferably up to ±0.5 mm relative to its perpendicular axis, has proved to be favorable.

With such a forming finger, a vial can be formed, in which first the mouth area is formed in an open, heat-softened end of a glass tube by a forming roller and the forming finger, which for formation of the heat-softened end of the glass tube and for support of it is moved into the glass tube end against the forming roller before the forming process and afterward again removed. Then the glass tube end is separated from the glass tube and formed into a complete vial by formation of a vial bottom. According to the invention, in this process the forming finger is inserted in the heat-softened glass tube end with horizontal or radial play and centered there by the rolled glass tube end.

To avoid rolling of the forming finger with the glass tube, a blocking element can be provided, which, e.g, can be a pin in the ball-and-socket joint.

To insert the forming finger in the glass tube end the bearing part again sits on a vertical carriage, which, for its part, is placed on a horizontal carriage, so that the forming finger can be shifted, on the one hand, in the radial direction and, on the other hand, in the longitudinal direction of the axis of the glass tube and thus can not only be inserted in the glass tube end and removed again, but also can be removed entirely from the vertical action area of the glass tube and the related glass tube receiving devices.

To avoid contamination of the carriages or the entire vial machine with forming oil, an oil drip tray is suitably placed under the forming finger. As described above, the oil drip tray can be connected to the forming finger and is then movable with it, but placing the oil drip tray in the bearing part is more favorable in this case. The oil drip tray is designed as a annular duct with a drain. The duct extends in this case to below a support for the glass tube, designed as a projecting collar, whose function has been described above, so that the draining oil and also possible glass splinters, despite the horizontal freedom of movement of the forming finger, can reach the oil drip tray. This also has the advantage that the ball-and-socket joint, placed under the forming finger, is protected from contamination.

As described above, the forming finger also in this case favorably has a shape deviating from the solid cylinder. The mouth is at least 90% removed from the point of contact with the forming roller, and the forming roller has at least one circular segment area supporting the inside of the mouth, so that a centering of the forming finger is possible. Suitably, the forming finger has the shape of a cylinder, flattened on both sides, with two remaining circular segment areas of preferably 100° to 150°. Circular segment areas of about 135 have proved particularly suitable The forming fingers, described both above and here, deviating from the solid cylinder, have, besides better heat dissipation properties, also the advantage that the forming oil, which is dripped on the forming finger from above, during the forming of the mouth can drain better on the free millings. The glass to be formed therefore can rest better on the circular segment areas.

As described above, the forming finger, horizontally freely movable in certain limits, can also be used in connection with a forming roller acting only on one side on the glass tube. A spring action, which holds the forming finger in its middle perpendicular position, is not necessary. This is also possible with the one-sided pressure of only one forming roller, since in this case the rotating rolled glass tube end supports the forming finger on its rear against the pressure exerted by the forming roller. Moreover, in this case a spring action of the forming roller and formation with spring pressure is also possible.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
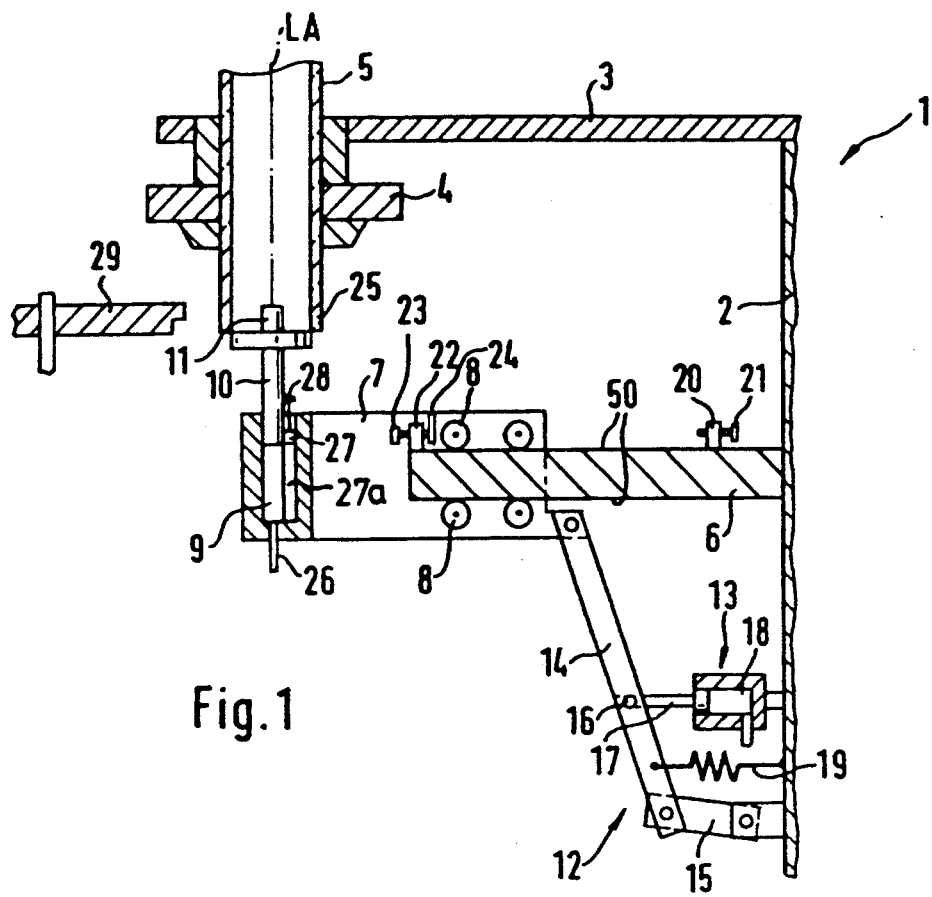
FIG. 1 is an elevational view of a vial machine with a forming finger placed according to the invention.

In FIG. 1 a vial machine 1 is represented in section in a position ar the beginning of a mouth formation. Vial machine 1 has as a base a carousel 2, also represented here only partially, which carries at the outside periphery of an upper planar element 3 in regular spacing distances rotatable receiving devices 4 (only one is represented) each for containing a glass tube 5.

A carriage 7, which is rail-guided on rail guide 50 by rollers 8, sits on a middle planar element 6. The rail guide 50 is aligned radially with respect to longitudinal axis LA of glass tube 5. A cylinder 9 is fastened to the front end of carriage 7 so that a piston 10, placed to shift in cylinder 9, is aligned lengthwise to longitudinal axis LA of glass tube 5. A forming finger 11 is fastened to the upper end of piston 10.

Carriage 7 can be shifted by a lever transmission 12 by a piston-cylinder combination 13. For this purpose, the upper end of a long lever 14 is joined on the back end of carriage 7 and the lower end of long lever 14 is jointed to a leveling piece 15, which in turn is jointed to carousel 2. Piston-cylinder combination 13 with its cylinder side end is also jointed to carousel 2, and by swivel joint 16 is connected to piston 17 which acts on the middle area of long lever 14. Piston-cylinder combination 13 can be operated hydraulically or pneumatically. The piston-cylinder combination is depressurized for the return of carriage 7, and a tension spring 19, connected to carousel 2 and acting on long lever 14, pulls carriage 7 back and thus shoves piston 17 into cylinder 18. In this case, carriage 7 moves back toward the carousel interior up to a stop 20. Stop 20 includes a correcting element 21, with which the return distance of carriage 7 can be limited just so that all parts carried by carriage 7 come outside the radius of action of glass tube 5 and optionally also outside its receiving devices.

For forward movement of carriage 7 piston-cylinder combination 13, e.g., is fed compressed air, by which piston 17 moves out and shifts carriage 7 with forming finger 11 in the toward longitudinal axis LA of glass tube 5. For this purpose, rail 50 is mounted radially with respect to longitudinal axis LA of glass tube 5 or of receiving device 4. So that forming finger 11 or piston 10, to which it is fastened, comes accurately to longitudinal axis LA of glass tube 5, on middle plane 6 a stop 22 is provided, which acts by an adjusting element 23 on a shoulder 24 connected to carriage 7. With correcting element 23 piston 10 with forming finger 11 can be adjusted accurately with respect to longitudinal axis LA.

As soon as carriage 7 has reached its external end position and thus has brought forming finger 12 to longitudinal axis LA, the latter can be shoved into lower glass tube end 25 by piston 10. For this purpose, cylinder 9 by its connection 26 is fed a fluid, e.g., compressed air, by which piston 10 is moved out to the point until a shoulder 27 on the piston abuts on a correcting element 28, which is set so that forming finger 11 is at a desired level relative to lower glass tube end 25 and a forming roller 29. In this position then forming roller 29 can roll lower glass tube end 25 against forming finger 11. At the same time shoulder 27 sliding in a groove 27a provides rotation of forming finger 11 as the glass tube 5 rotates.

After completion of the forming process, forming finger 11 can be removed from the now formed glass tube end 25 by piston 10 by application of partial vacuum on cylinder 9 or, if desired, also by a tension spring (not shown) and, as described, can be withdrawn in the direction of the carousel interior.

Figure 2A:
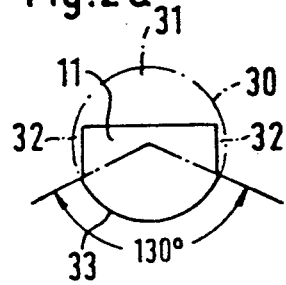
FIGS. 2A and 2B are sections through the forming finger according to the invention.

Forming finger 11, as known so far, can be designed as a usual cylinder, but a configuration of forming finger 11 as represented in FIG. 2a is advantageous.

This forming finger 11 is a part of an originally cylindrical shape 30, from which about 40% of back area 31 and about 7% each of side areas 32 (the percentage data refers to the original diameter of cylindrical shape 30) were milled off. In this way a cylinder segment resulted, as represented in cross section in FIG. 2a. This forming finger 11 has a circular segment area 33, which still has the original task of the forming finger, namely, smoothing and supporting (forming) the inside of the mouth to be formed.

Circular segment area 33 covers an angle of about 130°, against which forming roller 29 can sit and form. Corresponding to the angle of 130° circular segment area 33 has a length of 2.r.pi.130°, and r is the radius of the circular segment area. On the remaining sides of forming finger 11 no forming can take place, therefore this forming finger 11 is intended only for use in vial machines with one forming roller per forming station (as represented in FIG. 1).

The area of about 130° of a solid cylinder covered by circular segment area 33 depends on the design conditions of a respectively used vial machine or forming station.

If a forming on the forming finger above 180° or more is to be possible, only back area 31 need be removed from a solid cylinder. But normally, a circular segment area 33 of less than 180° is sufficient and also desirable, since by the removal of back area 31 and of side areas 32, the cross section of the forming finger is reduced so that easily and even without contact with the inside periphery of a completely formed mouth it can be removed from the latter.

Figure 2B:
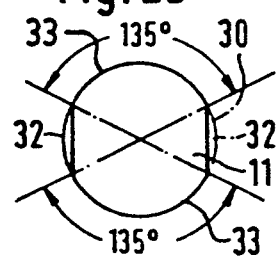

FIG. 2b shows a forming finger 11. Relative to cylindrical shape 30 only side areas 32 are milled free. This forming finger 11 has two circular segment areas 33 with an angle of about 135° each and is used in a formation with two forming rollers or with a movable support (described below) of the forming finger.

Figure 3:
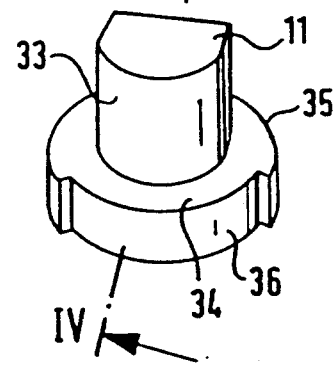
FIG. 3 is a perspective view of a forming finger according to the invention with a support.

A support 34 for a mouth edge to be formed can be provided on the lower end of forming finger 11 as represented in FIG. 3. This support 34 basically has the shape of a cylindrical disk 35 with larger diameter than cylindrical shape 30 and is placed concentric to the latter. Below circular segment area 33 cylindrical disk 35 has a recess 36, which forms a free space for forming roller 29, so that the latter in this case can press closer on forming finger 11 then the nominal size of the beaded rim outside diameter of a vial to be formed.

Figure 4:
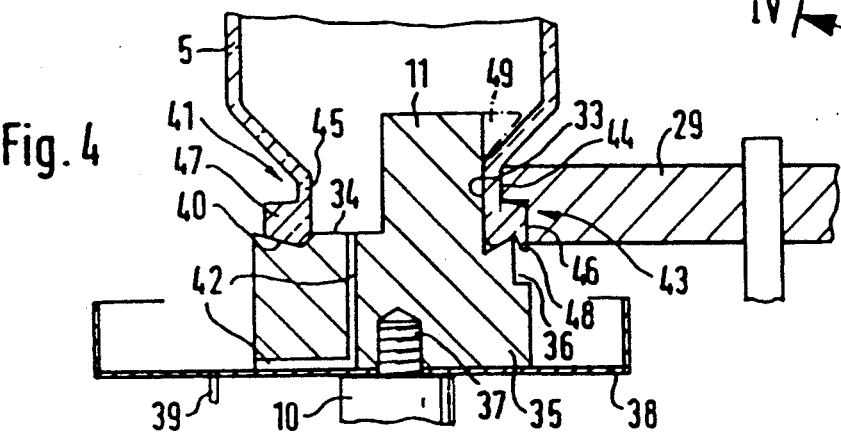
FIG. 4 is an elevational view through the forming finger according to FIG. 3 taken along line IV—IV during a forming process.

Such a situation is represented in FIG. 4. Cylindrical disk 35 is fastened to piston 10 at 37 (e g., by a bolt). Between piston 10 and cylindrical disk 35 an oil drip tray 38 is placed, which collects the forming oil sprayed over forming finger 11 and feeds it back by a drain 39.

Support 34 has a surface 40 sloping toward the center of the forming ringer, a surface that forms the upper edge of a vial mouth 41. The slope has an angle of 5 and depends on the respective purpose of the vial to be produced.

The forming oil can drain over the entire forming finger 11 and cylindrical disk 35, or else be drained by ducts 42 through the cylindrical disk.

During a forming process, the rotating glass tube 5 is pressed against circular segment area 33 of forming finger 11 by forming roller 29 on its end 25. Forming roller 29 exhibits on its edge a profile 43, whose outwardly projecting part 44, presses glass tube end 25 against circular segment area 33 and thus forms a vial neck 45. In front of an inwardly projecting part 46 of profile 43 a somewhat thicker glass bead is thus formed, which in contact with circular segment area 33 and sloping surface 40 is formed into a flanged or beaded rim 47. In this forming process, forming roller 29 can press a little closer to forming finger Il in the area of recess 36 so that a small lump 48 is pressed into the free space formed by recess 36. In this way, the nominal size of the beaded rim outside diameter becomes somewhat smaller. But by the rotation of glass tube 5 this small glass lump 48 is rotated out of the area of recess 36 and thus smoothed on sloping surface 40. By this measure even with slightly variable glass tube thicknesses, a clean mouth formation is always guaranteed. Moreover, with recess 36 it is achieved that forming roller 29 is not pressed against the outside edge of cylindrical disk 35 by which the support or holder of either forming finger Il or forming disk 29 could be damaged.

For particular configurations of a vial mouth on the upper end of forming finger 11 a widened edge 49 or collar can be provided which forms an undercut in vial neck 45 This forming finger 11 after formation has to be either offset radially or obliquely removed from the completely formed vial mouth 41. Such a removal of the forming finger is also advisable if no widened edge 49 is provided, since in this case circular segment area 33 without contact with the inside wall of the mouth can be removed from the latter.

Such a removal of forming finger 11 is possible only with a forming ringer, as represented in FIGS. 2a, 3 and 4. The solidly cylindrical forming finger, used so far, can be removed from the completely formed mouth only in the longitudinal direction of the glass tube.

To obtain an advantageous form of the forming finger according to the invention, the back area and side areas can also be removed differently than as represented, e.g., in the form of an oval. In this case, as large as possible a cross section surface of the forming finger should remain, so that the heat, absorbed on the circular segment area, can be dissipated quickly.

Figure 5:
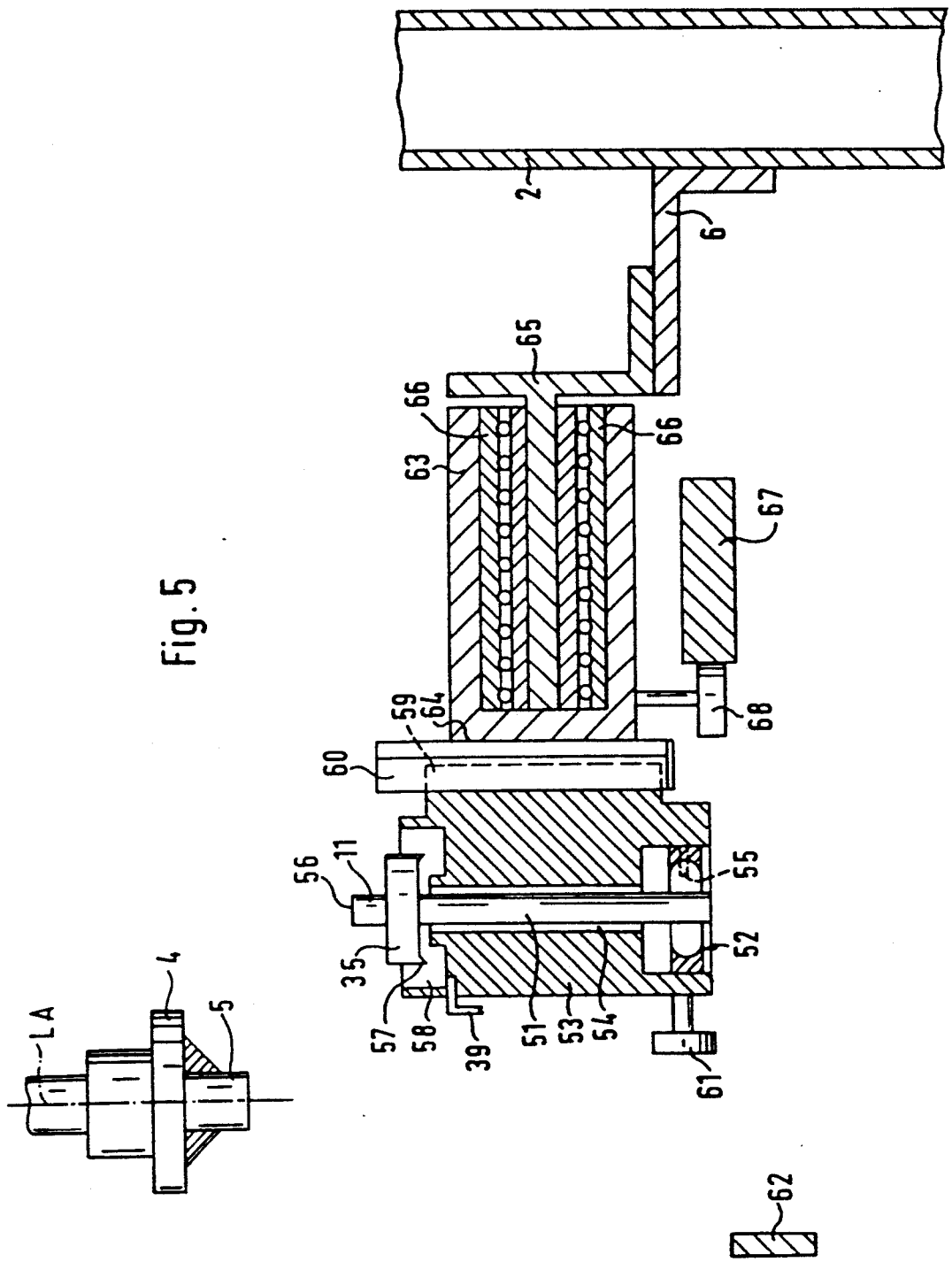
FIG. 5 is an elevational view showing a forming finger with ball-and-socket joint.

FIG. 5 shows a forming finger arrangement similar to FIG. 1, but with other shifting means, with which the same operation is achieved as in FIG. 1, and of another forming finger suspension.

In this case forming finger 11 is fastened to the upper end of a holding pin 51, whose lower end sits in a ball-and-socket joint 52. Ball-and-socket joint 52 allows a horizontal swiveling of holding pin 51 with forming finger 11 fastened to it. This horizontal swiveling movement is limited by a bearing part 53, on whose lower end ball-and-socket joint 52 sits and which exhibits a bore 54 in which holding pin 51 lies with about ±0.5-mm play.

To lock forming finger 11 from a rotation with glass tube, a locking pin 55 is inserted in ball-and-socket joint 52 that allows a swiveling of ball-and-socket joint 52 and with it also of forming finger 11 in the horizontal plane, but prevents rotation.

During the operation, before introduction of forming finger 11 into glass tube 5 a drop of forming oil is dropped on upper end 56 that, on the one hand, prevents a sticking of the forming finger to the heat-softened glass of glass tube 5, and moreover contributes to cooling forming finger 11. The forming oil can drain over the surface of forming finger 11 and over cylindrical disk 35 placed below forming finger 11 and drips by a sharply configured edge 57 into a annularly designed oil drip tray 58 and from there is collected by oil drain 39 at a central location (not represented).

Radially movable forming finger 11 can be vertically shifted by bearing part 53. For this purpose, bearing part 53 with a dovetail 59 placed parallel to bore 54 sits in a dovetail guide 60 and can be lifted and again lowered vertically by a roller 61 engaging a curved member or cam 62.

For radial shifting of forming finger 11 relative to longitudinal axis LA of glass tube 5, a horizontal carriage 63 is provided which on its front 64 carries its dovetail guide 60 and itself is held by a carrier part 65, which is connected to middle plane 6 of carousel 2.

Two linear roller guides 66 are placed between carrier part 65 and horizontal carriage 63, which allow a shifting of forming finger 11 from its rest position up to longitudinal axis LA of glass tube 5. The shifting takes place in this case by a curve or cam 67, which guides roller 68 connected to horizontal carriage 63. The return of horizontal carriage 63 can take place either by a return spring (not represented) or by another curve or cam (not represented).

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A device for forming a mouth area of an open, heat-softened end of a glass tube having a longitudinal axis while the glass tube rotates about the longitudinal axis, the device comprising:

a rotatable carousel having means for mounting and rotating the glass tube about the longitudinal axis (LA) thereof;

a carriage mounted on said carousel for radial movement with respect to the longitudinal axis of the glass tube mounted on the carousel, and a forming finger mounted on said carriage for axial movement with respect to the longitudinal axis of the tube for supporting the heat-softened end of the glass tube mounted on the carousel, and a forming roller for station located adjacent the carousel including a forming rolling the exterior surface of the end of the glass tube while the interior surface of the end of the glass tube is supported by the forming finger bearing there against in alignment with the forming roller opposite an area of the mouth engaged by the forming roller.

2. The device according to claim 1, wherein each forming finger includes an axis, the forming finger being used for inside forming of the mouth area about an axis to define a mouth of a selected radius of the tube supported by the forming finger in an open, heat-softened end of the glass tube, wherein the forming finger further includes a circular segment portion of a selected angle and length which contacts an inside periphery of the mouth area and determines the inside radius of the mouth and wherein the circular segment portion has a ratio of a cross-sectional surface area to the length of the circular segment portion which is larger than or equal to 0.55r, r being the radius of the selected angle of the circular segment portion as well as of the mouth.

3. The device according to claim 2, wherein the cross-section surface area of the circular segment portion of the forming finger is larger than or equal to 0.5 $r^2$ pi.

4. The device according to claim 2, wherein the selected angle of the circular segment portion of the forming finger is in the range of 60° to 190° of the circumference of a cylinder.

5. The device according to claim 4, wherein the selected angle of the circular segment portion of the forming finger is in a range of 100° to 150° of the circumference of a cylinder.

6. The device according to claim 2, wherein the forming finger further includes a cylindrical disk place concentrically with respect to the circular segment portion, which cylinder disk defines a support for the glass tube end and includes a circular peripheral surface having a radius which is greater than the radius of the selected angle of the circular segment portion.

7. The device according to claim 6, wherein the support has a surface sloping toward the axis of the forming finger.

8. The forming finger according to claim 6, the support having a peripheral area on an area thereof opposite the forming roller which peripheral area includes a recess.

9. The device according to claim 2, wherein the forming finger has on an upper end of the selected angle an outwardly projecting edge.

10. The device of claim 1, wherein the forming finger has a circular segment portion of a selected angle for supporting the heat-softened end of the glass tube against the forming roller and which has at least another circular segment portion of a selected angle removed providing the forming finger with horizontal play while within the mouth of the tube.

11. The device according to claim 10, wherein the forming finger is mounted on said carriage by a ball-and-socket joint.

12. The device according to claim 11, wherein the forming finger sits on one end of a holding pin having a lower end which connected to the ball-and-socket joint.

13. The device according to claim 12, wherein the holding pin is received in a guide which guide limits movement of the holding pin to a slight swiveling arc.

14. The device according to claim 10, wherein an oil drip tray with an oil drain is positioned under the forming finger.

15. The device according to claim 10, wherein the forming finger has the shape of a cylinder, flattened on both sides, with to remaining circular segment portions having angles of 100° to 150°.

* * * * *